United States Patent
Zhang et al.

(10) Patent No.: US 10,248,777 B2
(45) Date of Patent: *Apr. 2, 2019

(54) METHOD OF UNLOCKING TERMINAL DEVICE USING FINGERPRINT AND MOBILE TERMINAL

(71) Applicant: Guangdong Oppo Mobile Telecommunications Corp., Ltd., Dongguan, Guangdong (CN)

(72) Inventors: Haiping Zhang, Guangdong (CN); Yibao Zhou, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/975,894

(22) Filed: May 10, 2018

(65) Prior Publication Data

US 2018/0260552 A1 Sep. 13, 2018

Related U.S. Application Data

(63) Continuation of application No. PCT/CN2016/087776, filed on Jun. 29, 2016.

(30) Foreign Application Priority Data

Mar. 14, 2016 (CN) .......................... 2016 1 0146615

(51) Int. Cl.
*G06F 21/32* (2013.01)
*G06F 13/24* (2006.01)
(Continued)

(52) U.S. Cl.
CPC ............ *G06F 21/32* (2013.01); *G06F 3/0488* (2013.01); *G06F 13/24* (2013.01); *G06F 21/31* (2013.01);
(Continued)

(58) Field of Classification Search
CPC .......... G06F 21/32; G06F 21/30; G06F 21/31; G06F 21/44; G06F 13/24; G06F 3/041;
(Continued)

(56) References Cited

U.S. PATENT DOCUMENTS 9,195,878 B2 * 11/2015 Weber .................... G06F 3/044
9,846,800 B2 * 12/2017 Zhu .................... G06K 9/00073
(Continued)

FOREIGN PATENT DOCUMENTS

| CN | 101290414 A | 10/2008 |
| CN | 102902354 A | 1/2013 |

(Continued)

OTHER PUBLICATIONS

International Search Report issued in corresponding international application No. PCT/CN2016/087776 dated Dec. 19, 2016.
(Continued)

*Primary Examiner* — Meless N Zewdu
(74) *Attorney, Agent, or Firm* — Young Basile Hanlon & MacFarlane, P.C.

(57) ABSTRACT

An unlocking control method includes the following. An original fingerprint image is acquired and an interrupt request is triggered when a terminal device is in a screen-off state and a touch-press operation performed by a user on a fingerprint identification module of the terminal device is detected. A fingerprint identification process is performed on the original fingerprint image. The terminal device is unlocked and a screen of the terminal device is lit up when detecting that a result of the fingerprint identification process is matching.

12 Claims, 6 Drawing Sheets

(51) Int. Cl.
    *G06K 9/00*         (2006.01)
    *H04W 12/08*      (2009.01)
    *H04W 12/04*      (2009.01)
    *H04W 12/02*      (2009.01)
    *H04W 12/00*      (2009.01)
    *H04W 12/06*      (2009.01)
    *G06F 3/0488*     (2013.01)
    *G06F 21/31*      (2013.01)
    *G06F 21/00*      (2013.01)
    *G06F 9/445*      (2018.01)
    *H04W 88/02*      (2009.01)

(52) U.S. Cl.
    CPC .......... *G06K 9/00* (2013.01); *G06K 9/00013* (2013.01); *G06K 9/00087* (2013.01); *G06K 9/00926* (2013.01); *H04W 12/00* (2013.01); *H04W 12/02* (2013.01); *H04W 12/04* (2013.01); *H04W 12/06* (2013.01); *H04W 12/08* (2013.01); *G06F 9/445* (2013.01); *G06F 21/00* (2013.01); *H04W 88/02* (2013.01)

(58) Field of Classification Search
    CPC ........ G06F 3/0488; G06F 9/445; G06F 21/00; G06K 9/00; G06K 9/34; G06K 9/00013; G06K 9/00087; G06K 9/00926; H04W 12/00; H04W 12/06; H04W 12/08; H04W 12/04; H04W 188/02; H04W 88/02; H04W 12/02; H04W 12/10; H04M 2250/22
    See application file for complete search history.

(56) References Cited

U.S. PATENT DOCUMENTS

| | | | |
|---|---|---|---|
| 9,898,642 B2 * | 2/2018 | Han | G06K 9/00033 |
| 2004/0125993 A1 * | 7/2004 | Zhao | G06K 9/00006 382/124 |
| 2008/0049987 A1 * | 2/2008 | Champagne | G06K 9/00026 382/124 |
| 2009/0177966 A1 | 7/2009 | Chaudhri | |
| 2010/0303310 A1 * | 12/2010 | Chiu | G06K 9/0008 382/124 |
| 2014/0283128 A1 | 9/2014 | Shepherd et al. | |
| 2015/0186017 A1 * | 7/2015 | Lee | H04M 1/67 715/771 |
| 2015/0199554 A1 | 7/2015 | Merrell et al. | |
| 2017/0076080 A1 * | 3/2017 | Hao | G06F 21/32 |
| 2017/0098114 A1 * | 4/2017 | Hung | G06K 9/00087 |
| 2017/0108977 A1 * | 4/2017 | Li | G06F 3/0416 |
| 2017/0147865 A1 * | 5/2017 | Jensen | G06K 9/00053 |
| 2018/0089409 A1 * | 3/2018 | Zhang | G06F 21/32 |
| 2018/0114006 A1 * | 4/2018 | Yang | G06K 9/00087 |

FOREIGN PATENT DOCUMENTS

| | | |
|---|---|---|
| CN | 103345616 A | 10/2013 |
| CN | 104391635 A | 3/2015 |
| CN | 104899029 A | 9/2015 |
| CN | 104917894 A | 9/2015 |
| CN | 105159726 A | 12/2015 |
| CN | 105335730 A | 2/2016 |
| CN | 105809003 A | 7/2016 |
| EP | 2230623 A1 | 9/2010 |

OTHER PUBLICATIONS

Extended European search report issued in corresponding European application No. 16894081.5 dated Oct. 10, 2018.

* cited by examiner

METHOD OF UNLOCKING TERMINAL DEVICE USING FINGERPRINT AND MOBILE TERMINAL

CROSS-REFERENCE TO RELATED APPLICATION(S)

This application is a continuation of International Application No. PCT/CN2016/087776, filed on Jun. 29, 2016, which claims priority to Chinese Patent Application No. 201610146615.4, filed on Mar. 14, 2016, the contents of both of which are hereby incorporated by reference in their entireties.

TECHNICAL FIELD

The present disclosure relates to the field of electronics technology, and particularly to an unlocking control method and a terminal device.

BACKGROUND

At present, fingerprint identification technology has become a standard configuration of mainstream terminal devices (such as smart phones, tablet PCs, or the like). When the fingerprint identification technology is used in unlocking, waking up, and other functions of the terminal device, this process can be achieved as follows. A fingerprint image entered by a current user is acquired, and then the fingerprint image is processed preliminarily to make it clearer. Thereafter, feature points of the processed fingerprint image are compared with feature points of fingerprint templates stored in the terminal device. A system can be unlocked when the processed fingerprint image matches the fingerprint template. Time from acquiring the fingerprint image to unlocking the system is generally called unlocking time.

The length of the unlocking time has become one aspect of competition of various manufacturers. How to optimize the unlocking time of the terminal device has become a technical problem to be solved in the field.

SUMMARY

Implementations of the disclosure provide an unlocking control method and a terminal device to shorten unlocking time of a terminal device.

According to the implementations of the disclosure, there is provided an unlocking control method. The method includes the following operations.

An original fingerprint image is acquired and an interrupt request is triggered when a terminal device is in a screen-off state and a touch-press operation performed by a user on a fingerprint identification module of the terminal device is detected, and a fingerprint identification process is performed on the original fingerprint image.

The terminal device is unlocked and a screen of the terminal device is lit up when detecting that a result of the fingerprint identification process is matching.

BRIEF DESCRIPTION OF THE DRAWINGS

To describe the technical solutions in the implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The following are described in detail.

The terms "first", "second", "third", and "fourth" used in the specification, the claims, and the accompany drawings of the present disclosure are used for distinguishing between different objects rather than describing a particular order. The terms "include", "comprise", and "have" as well as variations thereof are intended to cover non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

Hereinafter, some terms of the present disclosure will be explained and interpreted to facilitate understanding by those skilled in the art.

"Terminal devices", also known as user equipments (UE), are devices that provide voice and/or data connectivity to a user, for example, handheld devices having wireless connection functions, in-vehicle devices, and the like. Common terminals include, for example, mobile phones, tablets, laptops, palmtops, mobile internet devices (MID), wearable devices such as smart watches, smart bracelets, pedometers, and the like.

According to implementations of the present disclosure, an unlocking control method is provided. The method includes: acquiring an original fingerprint image and triggering an interrupt request when a terminal device is in a screen-off state and a touch-press operation performed by a user on a fingerprint identification module of the terminal device is detected, and performing a fingerprint identification process on the original fingerprint image; and unlocking the terminal device and lighting up a screen of the terminal device when detecting that a result of the fingerprint identification process is matching.

In one implementation, the fingerprint identification process includes: performing image enhancement on the original fingerprint image to obtain a target fingerprint image; comparing feature points of the target fingerprint image with feature points of a pre-stored registered fingerprint template; determining that the target fingerprint image is matched with the pre-stored registered fingerprint template when a ratio of matched feature points of the target fingerprint image and the pre-stored registered fingerprint template is greater than or equal to a preset threshold; or determining that the target fingerprint image is not matched with the pre-stored registered fingerprint template when the ratio of matched feature points of the target fingerprint image and the pre-stored registered fingerprint template is less than the preset threshold.

In one implementation, the pre-stored registered fingerprint template comprises N pre-stored registered fingerprint templates and N is an integer greater than 1. Comparing feature points of the target fingerprint image with feature points of a pre-stored registered fingerprint template includes: acquiring the number of times of comparison of the N pre-stored registered fingerprint templates in a preset time period; sorting the N pre-stored registered fingerprint templates in descending order of the number of times of comparison acquired; comparing the feature points of the target fingerprint image with feature points of sorted N pre-stored registered fingerprint templates sequentially.

After lighting up the screen of the terminal device, an application that was running when the screen of the terminal device was locked last time will be loaded, or, an application bound to the target fingerprint image will be loaded.

In one implementation, lighting up a screen of the terminal device includes: acquiring brightness of a current environment and lighting up the screen of the terminal device according to the brightness of the current environment.

In one implementation, the touch-press operation comprises a touch operation and a press operation. Upon detection of the touch operation, conduct the process of acquiring the original fingerprint image and performing a fingerprint identification process on the original fingerprint image, and during the original fingerprint image acquisition and the fingerprint identification process, conduct the process of triggering the interrupt request. Alternatively, trigger the interrupt request upon detection of the touch operation, and during the triggering, acquire the original fingerprint image and perform the fingerprint identification process.

According to implementations of the present disclosure, a terminal device is provided. The terminal device includes a memory and a processor. The memory is configured to store executable program codes. The processor is coupled with the memory. The processor is configured to invoke the executable program codes stored in the memory to execute the operations of the unlocking control method of the disclosure.

According to implementations of the present disclosure, a non-transitory computer storage medium is provided.

Implementations of the disclosure will be detailed below with reference to the accompanying drawings. The non-transitory computer storage medium is configured to store programs that, when executed, are configured to conduct operations of the unlocking control method of the disclosure.

Figure 1:
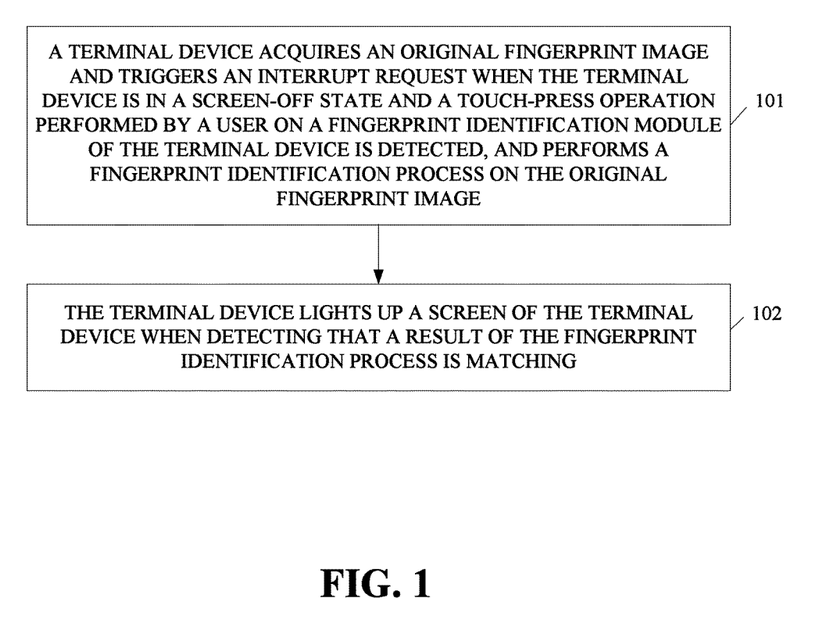
FIG. 1 is a schematic flow chart illustrating an unlocking control method according to an implementation of the present disclosure.
Figure 2:
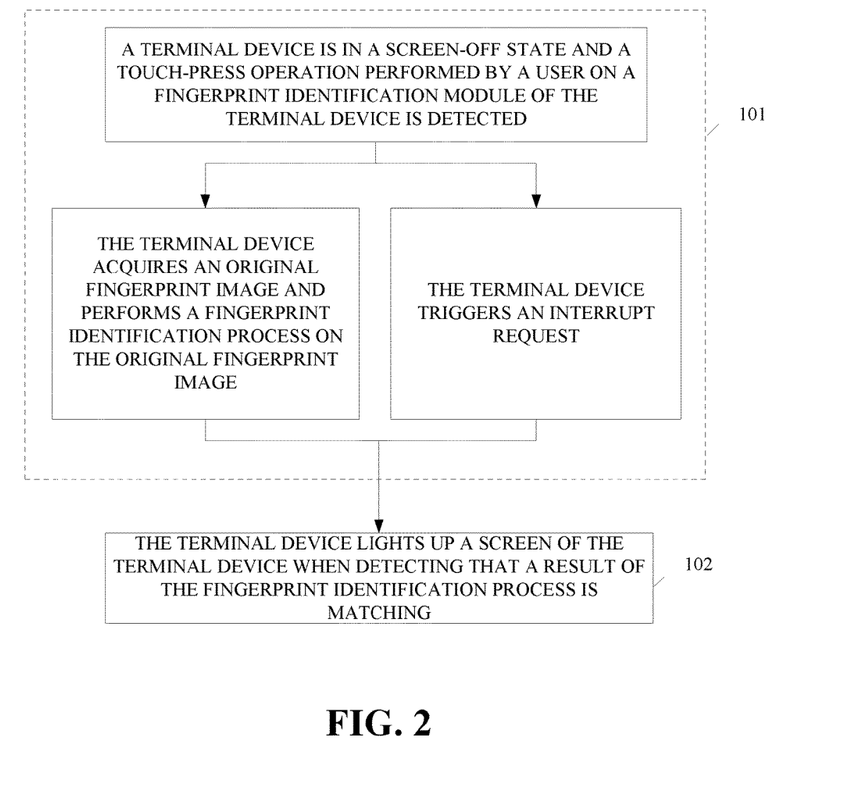
FIG. 2 is a schematic flow chart illustrating another unlocking control method according to an implementation of the present disclosure.

FIGS. 1 and 2 are schematic flow charts illustrating an unlocking control method according to an implementation of the present disclosure. The method begins at block 101.

At block 101, a terminal device acquires an original fingerprint image and triggers (in other words, initiates or transmits) an interrupt request (IRQ) when the terminal device is in a screen-off state and a touch-press operation performed by a user on a fingerprint identification module of the terminal device is detected, and performs a fingerprint identification process on the original fingerprint image.

In some possible implementations, the press interrupt request can be sent to a processor or other modules of the terminal device to wake up the terminal device, such that the terminal device can respond to the touch-press operation of the user for example.

At block 102, the terminal device lights up a screen of the terminal device when detecting that a result of the fingerprint identification process is matching.

In one implementation, when the result of the fingerprint identification process is not matching, that is, when the fingerprint identification process fails, the screen will be lit up after the interrupt request process is finished, for example, after the terminal device responds to the interrupt request.

Figure 3:
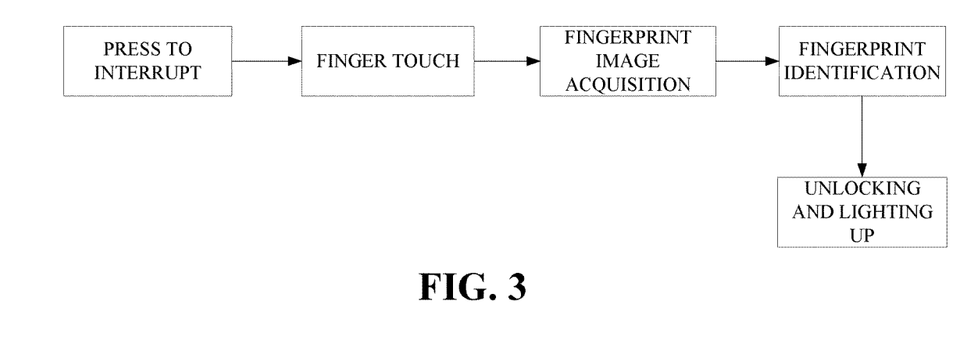
FIG. 3 is a schematic flow chart illustrating the screen lighting-up process of the related art.
Figure 4:
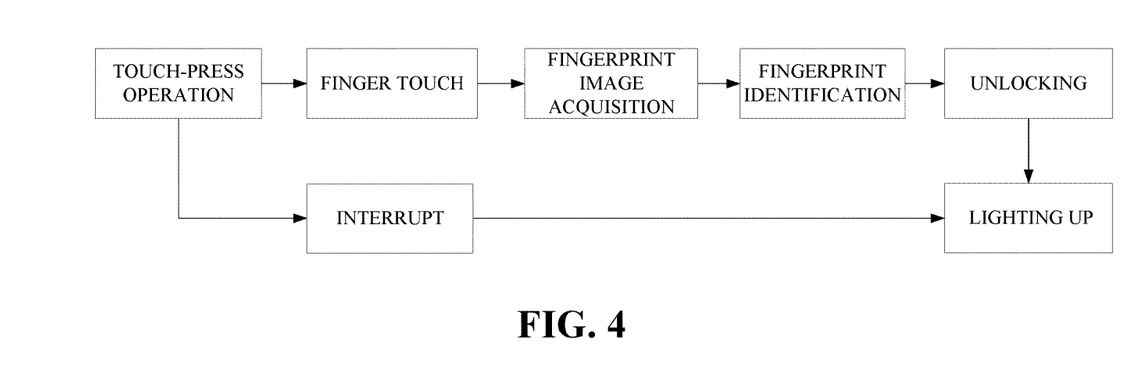
FIG. 4 is a schematic flow chart illustrating the screen lighting-up process of the present disclosure.

As one implementation, the fingerprint identification module can be integrated with a dome button. When the terminal device is in the screen-off state, to unlock and light up the screen, the user needs to press the dome button. Currently, as illustrated in FIG. 3, the process includes press-to-interrupt, finger-touch, fingerprint image acquisition, fingerprint identification, and screen unlocking and lighting up that are performed sequentially. In the related art, unlocking time in a screen-off press-to-unlock mode (that is, press-to-unlock in the screen-off state) refers to a duration from press-to-interrupt to screen unlocking and lighting up. The time required to press-to-light up the screen is about 60 ms to 100 ms, and the time required to acquire a fingerprint image and then match the fingerprint image is about 100 ms, as a result, in the related art, the unlocking time in the screen-off press-to-unlock mode is a sum of the above time. In the screen-off state, when the user press-to-unlock the screen, what the user can sense are the moment of pressing the dome button and the moment of lighting up the screen. However, before the user presses the dome button, a finger of the user touches the dome button first. To shorten the unlocking time required to press-to-unlock the screen in the screen-off state, according to the technical solutions provided herein, as illustrated in FIG. 4, when the terminal device detects a touch operation performed by the user on the dome button, the terminal device acquires the original fingerprint image and performs the fingerprint identification process on the original fingerprint image. During or before the process of acquiring the original fingerprint image and performing the fingerprint identification process on the original fingerprint image, when the terminal device detects a press operation performed by the user on the dome button, the terminal device triggers the interrupt request (IRQ). In this situation, the terminal device is in the screen-off state or a suspending state. Thereafter, the terminal device interrupts the suspending state of hardware of the terminal device through the IRQ to resume the system. The original fingerprint image is a fingerprint image of the finger of the user acquired by the terminal device initially, that is, an image that has not been subjected to image processing.

Compared with the process in the related art, in this disclosure, the press-to-unlock process in the screen-off state includes two threads which are performed in parallel, one is finger-touch, fingerprint image acquisition, fingerprint identification, screen unlocking, then screen lighting up, and the other one is press-to-interrupt and screen lighting up. The two threads are performed in parallel, so the unlocking time of the screen-off press-to-unlock only needs to take into consideration the fingerprint unlocking time (100 ms) and consequently, the duration from pressing to lighting up the screen (60 ms to 100 ms) is not counted, thereby reducing the unlocking time of the press-to-unlock process in the screen-off state and further improving user experience.

Figure 5:
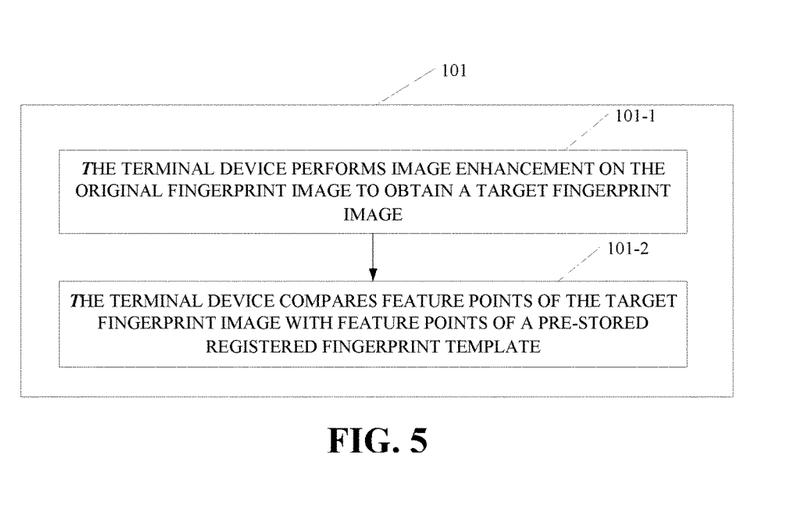
FIG. 5 is a schematic flow chart illustrating yet another unlocking control method according to an implementation of the present disclosure.

Referring to FIG. 5, at block 101, the terminal device performs the fingerprint identification process on the original fingerprint image as follows.

At block 101-1, the terminal device performs image enhancement on the original fingerprint image to obtain a target fingerprint image.

At block 101-2, the terminal device compares feature points of the target fingerprint image with feature points of a pre-stored registered fingerprint template.

The terminal device determines that the target fingerprint image is matched with the pre-stored registered fingerprint template when a ratio of matched feature points of the target fingerprint image and the pre-stored registered fingerprint template is greater than or equal to a preset threshold; otherwise, the terminal device determines that the target fingerprint image is not matched with the pre-stored registered fingerprint template when the ratio of matched feature points of the target fingerprint image and the pre-stored registered fingerprint template is less than the preset threshold. For example, the "ratio" mentioned above may refer to the ratio of matched feature points to whole feature points in the fingerprint template.

As one implementation, false rejection rate (FRR) refers to a probability of false rejection when same fingerprints are identified as different fingerprints and rejected. That is, the FRR is a ratio of the number of false rejected fingerprints to the total number of fingerprints compared. FRR=(the number of fingerprints false rejected/the total number of fingerprints examined)*100%. False accept rate (FAR) refers to a probability of false accept due to different fingerprints are identified as same fingerprints and accepted. That is, the FAR is a ratio of the number of false accepted fingerprints to the total number of fingerprints compared. FAR=(the number of fingerprints false accepted/the total number of fingerprints examined)*100%. To reduce the FRR or increase the FAR, before the fingerprint identification, the terminal device performs the image enhancement on the original fingerprint image to obtain the target fingerprint image and thereafter the terminal device compares feature points of the target fingerprint image with feature points of the pre-stored registered fingerprint template. The terminal device determines that the target fingerprint image is matched with the pre-stored registered fingerprint template when the ratio of matched feature points of the target fingerprint image and the pre-stored registered fingerprint template is greater than or equal to the preset threshold; otherwise, the terminal device determines that the target fingerprint image is not matched with the pre-stored registered fingerprint template when the ratio of matched feature points of the target fingerprint image and the pre-stored registered fingerprint template is less than the preset threshold. As the time for the fingerprint comparison accounts for ⅓ of the unlocking time of unlocking in the screen-off state, in order to further shorten the unlocking time in the screen-off state, according to a curve graph of the FRR and the threshold, for example, the preset threshold can be reduced from 80% to 70% or other values and the FRR can be reduced from 1% to 0.1%, as a consequence, the comparison time can be reduced by at least 30 ms. In this case, since the FRR is reduced to 0.1%, the user experience can be improved, however, the FAR will increase from ⅕ million to 1/1 million for example, this security level is the same as that of the four-digit password and will not cause too many user security issues. In addition, with regarding to fingerprint payment, as the fingerprint payment concerns more on security rather than the unlocking time, therefore, in this situation, do not reduce the unlocking time by modifying the FAR.

Figure 6:
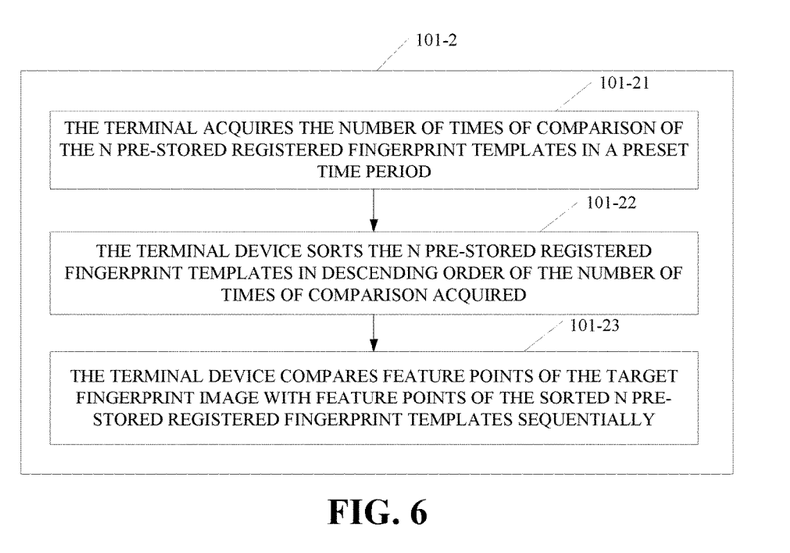
FIG. 6 is a schematic flow chart illustrating still another unlocking control method according to an implementation of the present disclosure.

For example, the pre-stored registered fingerprint template includes N pre-stored registered fingerprint templates and N is an integer greater than 1. As illustrated in FIG. 6, the terminal device compares feature points of the target fingerprint image with feature points of the pre-stored registered fingerprint template as follows.

At block 101-21, the terminal acquires the number of times of comparison of the N pre-stored registered fingerprint templates in a preset time period.

At block 101-22, the terminal device sorts the N pre-stored registered fingerprint templates in descending order of the number of times of comparison acquired.

At block 101-23, the terminal device compares feature points of the target fingerprint image with feature points of the sorted N pre-stored registered fingerprint templates sequentially.

As one implementation, the terminal device can generally have multiple fingerprints registered, that is, the user can register two or more fingerprints into the terminal device, and the upper limit is generally around eight. Each registered fingerprint template image generally has about twenty fingerprint images. It can be seen, the more the registered fingerprints, the longer the comparison time during fingerprint unlocking. In general, if only one fingerprint is registered, during the fingerprint unlocking, only twenty fingerprint images of the registered one fingerprint need to be compared, the comparison speed is very fast, that is, the unlocking time is very short, usually about 60 ms to 80 ms. However, if five fingerprints are registered, a fingerprint for current unlocking is compared with templates of the five fingerprints in order, such that the unlocking time will be multiplied.

As an example, if the pre-stored registered fingerprint template of the terminal device includes N pre-stored registered fingerprint templates, to accelerate the speed of fingerprint identification, the N pre-stored registered fingerprint templates can be sorted according to priority first. This process can be achieved as follows. The terminal device acquires the number of times of comparison of the N pre-stored registered fingerprint templates in the preset time period (for example, one month), and then sorts the N pre-stored registered fingerprint templates in descending order of the number of times of comparison acquired. For instance, the registered fingerprint template includes fingerprint template 1, fingerprint template 2, and fingerprint template 3, and the number of times of comparison of fingerprint template 1, fingerprint template 2, and fingerprint template 3 in one month are respectively 100, 10, and 5, the sorting result will be: fingerprint template 1, fingerprint template 2, and fingerprint template 3. At last, the terminal device compares feature points of the target fingerprint image with feature points of the sorted N pre-stored registered fingerprint templates sequentially. That is, the terminal device compares the target fingerprint image with fingerprint template 1 first, and if the target fingerprint image is matched with fingerprint template 1, the comparison will be stopped; otherwise, if the target fingerprint image is not matched with fingerprint template 1, the target fingerprint image will be compared with fingerprint template 2. The process will be continued in this manner.

As another example, if the pre-stored registered fingerprint template of the terminal device includes N pre-stored registered fingerprint templates, to speed up fingerprint identification, the N pre-stored registered fingerprint templates can be sorted according to priority first. This process can be achieved as follows. The terminal device acquires the priority of each of the N pre-stored registered fingerprint templates, where the priority is set when registering the N pre-stored registered fingerprint templates. Thereafter, the terminal device sorts the N pre-stored registered fingerprint templates in descending order of the priority of each of the N pre-stored registered fingerprint templates (the priority includes priority 1, priority 2, and priority 3, where priority 1 is higher than priority 2, etc.). For example, the registered fingerprint template includes fingerprint template 1, fingerprint template 2, and fingerprint template 3, and the priority of fingerprint template 1 is priority 1, the priority of fingerprint template 2 is priority 2, and the priority of fingerprint template 3 is priority 3, the sorting result will be: fingerprint template 1, fingerprint template 2, and fingerprint template 3. Finally, the terminal device sequentially compares feature points of the target fingerprint image with feature points of the sorted N pre-stored registered fingerprint templates. That is, the terminal device first compares the target fingerprint image with fingerprint template 1, if the target fingerprint image is matched with fingerprint template 1, the comparison will be stopped; otherwise, if the target fingerprint image is not matched with fingerprint template 1, the terminal device will compare the target fingerprint image with fingerprint template 2. The process will be continued in this manner.

At block 102, how the terminal device lights up the screen of the terminal device is described hereinafter. The terminal acquires brightness of a current environment and then lights up the screen of the terminal device according to the brightness of the current environment.

In order to protect eyes, current terminal devices generally have a function of automatically adjusting the brightness of the screen. When the terminal device turns on the auto-sensing function, the terminal device obtains the brightness of the current environment through a light sensor. Then, according to a mapping relation between the brightness of the current environment and the brightness of the screen, the terminal device determines brightness of a target screen corresponding to the brightness of the current environment and finally, the terminal device lights up the screen of the terminal device according to the brightness of the target screen, so as to improve the user experience and protect the eyes of the user.

As one implementation, after the terminal device lights up the screen of the terminal device (at block 102), the unlocking control method illustrated in FIG. 1 further includes the following operations. An application that was running when the screen of the terminal device was locked last time is loaded. Alternatively, an application bound to the target fingerprint image (in other words, an application associated with the target fingerprint image) is loaded.

As one implementation, after the terminal device lights up the screen of the terminal device (at block 102), to improve the user experience, the terminal device can load the application that was running when the screen of the terminal device was locked last time (in other words, the previous time). The process can be achieved as follows. The terminal device acquires a page of the application that was running when the screen was locked last time. After the terminal device lights up the screen, the terminal device directly displays the page of the application that was running when the screen was locked last time. Alternatively, the terminal device can load an application bound to the target fingerprint image. The process can be achieved as follows. The terminal device acquires the application bound to the target fingerprint image and then enables the application. Optionally, the terminal device can acquire an application bound to the target fingerprint image and a page of the application when the application was opened last time, and then load the page acquired.

The process of press-to-unlock in the screen-off state in the implementations of the disclosure includes two sets of actions which are performed in parallel, one is touch operation, fingerprint image acquisition, fingerprint identification, screen unlocking, and screen lighting up, and the other is press-to-interrupt and screen lighting up, where the two sets of actions are performed concurrently. Compared with the press-to-unlock in the screen-off state in the related art in which press-to-interrupt, touch operation, fingerprint image acquisition, fingerprint identification, and screen unlocking and lighting up are conducted sequentially, by means of the technical schemes provided herein, the unlocking time of the press-to-unlock operation in the screen-off state can be shorter and the user experience can further be improved.

A device of the implementation of the present disclosure for implementing the above methods will be described hereinafter with reference to the accompanying drawings.

Figure 7:
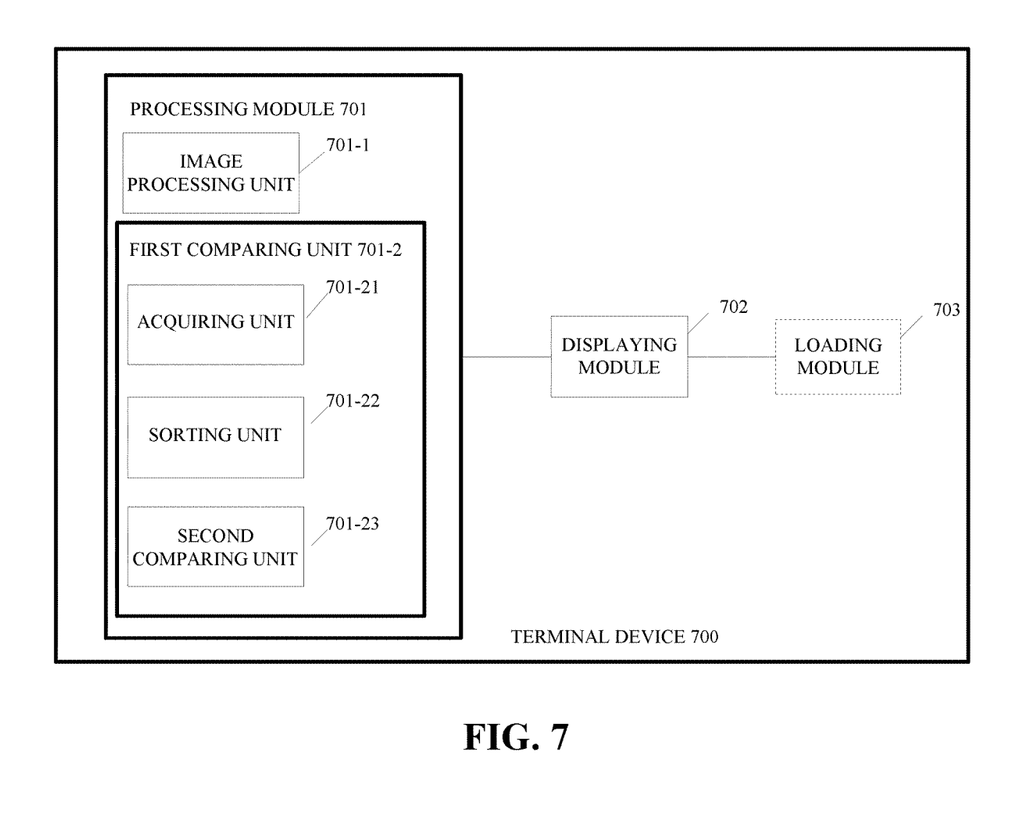
FIG. 7 is a schematic structural diagram illustrating a terminal device according to an implementation of the present disclosure.

FIG. 7 is a structural schematic diagram illustrating a terminal device according to an implementation of the present disclosure.

As illustrated in FIG. 7, the terminal device 700 can include a processing module 701 and a displaying module 702. The processing module 701 can be a fingerprint sensor with a processor integrated or connected. The displaying module 702 can be a screen controller and coupled with or integrated with the fingerprint sensor.

The processing module 701 is configured to acquire an original fingerprint image and trigger an interrupt request when the terminal device is in a screen-off state and a touch-press operation performed by a user on a fingerprint identification module of the terminal device is detected, and perform a fingerprint identification process on the original fingerprint image.

The displaying module 702 is configured to light up a screen of the terminal device when detecting that a result of the fingerprint identification process is matching.

As one implementation, the displaying module 702 is configured to acquire brightness of a current environment and light up the screen of the terminal device according to the brightness of the current environment.

As one implementation, the processing module 701 includes an image processing unit 701-1 and a first comparing unit 701-2.

The image processing unit 701-1 is configured to perform image enhancement on the original fingerprint image to obtain a target fingerprint image.

The first comparing unit 701-2 is configured to compare feature points of the target fingerprint image with feature points of a pre-stored registered fingerprint template, and determine that the target fingerprint image is matched with the pre-stored registered fingerprint template when a ratio of matched feature points of the target fingerprint image and the pre-stored registered fingerprint template is greater than or equal to a preset threshold, or determine that the target fingerprint image is not matched with the pre-stored registered fingerprint template when the ratio of matched feature points of the target fingerprint image and the pre-stored registered fingerprint template is less than the preset threshold.

As one implementation, the pre-stored registered fingerprint template includes N pre-stored registered fingerprint templates and N is an integer greater than 1. The first comparing unit 701-2 includes an acquiring unit 701-21, a sorting unit 701-22, and a second comparing unit 701-23.

The acquiring unit 701-21 is configured to acquire the number of times of comparison of the N pre-stored registered fingerprint templates in a preset time period.

The sorting unit 701-22 is configured to sort the N pre-stored registered fingerprint templates in descending order of the number of times of comparison acquired.

The second comparing unit 701-23 is configured to compare feature points of the target fingerprint image and feature points of the sorted N pre-stored registered fingerprint templates sequentially.

As one implementation, the terminal device illustrated in FIG. 7 further includes a loading module 703.

The loading module 703 is configured to load an application that was running when the screen of the terminal device was locked last time or load an application bound to the target fingerprint image, after the displaying module 702 lights up the screen of the terminal device when detecting that the result of the fingerprint identification process is matching.

It is to be noted that, the above-mentioned modules (the processing module 701, the displaying module 702, and the loading module 703) are configured to execute corresponding operations of the above methods.

In this implementation, the terminal device 700 is presented in the form of modules. The "module" herein may refer to an application-specific integrated circuit (ASIC), a processor and a memory that can execute one or more software or firmware programs, an integrated logic circuit, and/or other components that can achieve the above-described functions. In addition, the processing module 701, the displaying module 702, and the loading module 703 are implemented by the processor of the terminal device illustrated in FIG. 8.

Figure 8:
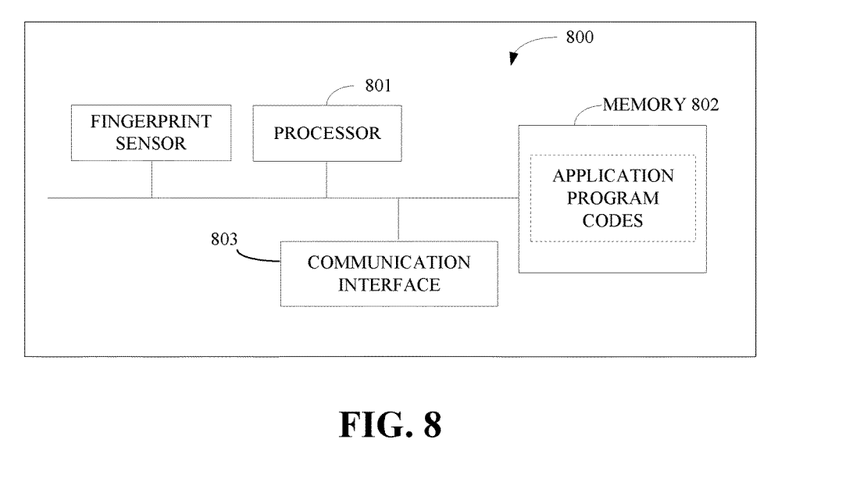
FIG. 8 is a schematic structural diagram illustrating another terminal device according to an implementation of the present disclosure.

FIG. 8 is a structural schematic diagram illustrating a terminal device according to an implementation of the present disclosure. As illustrated in FIG. 8, the terminal device includes at least one processor 801, at least one memory 802, and at least one communication interface 803. In addition, the terminal device can further include a fingerprint identification module such as a fingerprint sensor. The fingerprint identification module is configured to acquire a fingerprint image entered by a user. The terminal device can further include general components such as an antenna and so forth. The disclosure will not be elaborated herein.

The processor 801 can be a general-purpose central processing unit (CPU), a microprocessor, an application-specific integrated circuit (ASIC), or one or more integrated circuits for controlling the execution of a program of the above schemes.

The communication interface 803 is configured to communicate with other devices or communication networks, such as an Ethernet, a radio access network (RAN), a wireless local area network (WLAN), and the like.

The memory 802 may be a read-only memory (ROM) or other types of static storage devices that can store static information and instructions, a random access memory (RAM) or other types of dynamic storage devices that can store information and instructions, or an electrically erasable programmable read-only memory (EEPROM), a compact disc read-only memory (CD-ROM), or other optical disk storage, optical disk storage (including compact discs, laser discs, optical discs, digital versatile discs, blu-ray discs, etc.), magnetic disk storage medium, or other magnetic storage devices, or any other mediums that can be used to carry or store desired program codes in the form of instructions or data structures and can be accessed by a computer. The disclosure is not limited thereto. The memory can be separated from the processor and connected to the processor via a bus. The memory can also be integrated with the processor.

The memory 802 is configured to store application program codes for executing the above schemes. The processor 801 is configured to execute the application program codes stored in the memory 802.

For the terminal device illustrated in FIG. 8, the application program codes stored in the memory 802 can be configured to execute the unlocking control method executed by the above terminal device. For instance, when the terminal device is in the screen-off state and a touch-press operation performed by a user on a fingerprint identification module of the terminal device is detected, an original fingerprint image is acquired, a fingerprint identification process is then performed on the original fingerprint image, and an interrupt request (IRQ) is triggered. When detecting that a result of the fingerprint identification process is matching, a screen of the terminal device is lit up.

Implementations of the present disclosure also provide a computer readable storage medium. The computer readable storage medium can store programs which, when executed, can implement all or part of the operations of any of the unlocking control methods described in the above-described method implementations.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method of unlocking a terminal device using fingerprint, comprising:
   acquiring an original fingerprint image and triggering an interrupt request when a terminal device is in a screen-off state and a touch-press operation performed by a user on a fingerprint identification module of the terminal device is detected, and performing a fingerprint identification process on the original fingerprint image; and
   unlocking the terminal device and lighting up a screen of the terminal device when detecting that a result of the fingerprint identification process is matching;
   wherein performing the fingerprint identification process on the original fingerprint image comprises:
   performing image enhancement on the original fingerprint image to obtain a target fingerprint image;
   comparing feature points of the target fingerprint image with feature points of a pre-stored registered fingerprint template; and one of:
   determining that the target fingerprint image is matched with the pre-stored registered fingerprint template when a ratio of the matched feature points of the target fingerprint image and the pre-stored registered fingerprint template is greater than or equal to a preset threshold; and determining that the target fingerprint image is not matched with the pre-stored registered fingerprint template when the ratio of the matched feature points of the target fingerprint image and the pre-stored registered fingerprint template is less than the preset threshold; and
   wherein the pre-stored registered fingerprint template comprises N pre-stored registered fingerprint templates and N is an integer greater than 1, and comparing the feature points of the target fingerprint image with the feature points of the pre-stored registered fingerprint template comprises:
   acquiring a number of times of comparison of the N pre-stored registered fingerprint templates in a preset time period;
   sorting the N pre-stored registered fingerprint templates in descending order of the number of times of the comparison acquired; and
   comparing the feature points of the target fingerprint image with the feature points of the sorted N pre-stored registered fingerprint templates sequentially.

2. The method of claim 1, further comprising:
   after lighting up the screen of the terminal device, performing one of:
   loading an application that was running when the screen of the terminal device was locked last time; and
   loading an application bound to the target fingerprint image.

3. The method of claim 2, wherein the lighting up the screen of the terminal device comprises:
   acquiring brightness of a current environment and lighting up the screen of the terminal device according to the brightness of the current environment.

4. The method of claim 1, wherein the touch-press operation comprises a touch operation and a press operation.

5. The method of claim 4, wherein acquiring the original fingerprint image and triggering the interrupt request when the terminal device is in the screen-off state and the touch-press operation performed by the user on the fingerprint identification module of the terminal device is detected, and performing the fingerprint identification process on the original fingerprint image comprises:
   acquiring the original fingerprint image and performing the fingerprint identification process on the original fingerprint image upon detection of the touch operation, and during the original fingerprint image acquisition and the fingerprint identification process, triggering the interrupt request.

6. The method of claim 4, wherein acquiring the original fingerprint image and triggering the interrupt request when the terminal device is in the screen-off state and the touch-press operation performed by the user on the fingerprint identification module of the terminal device is detected, and performing the fingerprint identification process on the original fingerprint image comprises:

triggering the interrupt request upon detection of the touch operation, and during the triggering, acquiring the original fingerprint image and performing the fingerprint identification process.

7. A terminal device, comprising:
a memory, configured to store executable program codes; and
a processor, coupled with the memory, wherein the processor is configured to invoke the executable program codes stored in the memory to:
acquire an original fingerprint image and trigger an interrupt request when the terminal device is in a screen-off state and a touch-press operation performed by a user on a fingerprint identification module of the terminal device is detected, and perform a fingerprint identification process on the original fingerprint image; and
unlock the terminal device and lighting up a screen of the terminal device when detecting that a result of the fingerprint identification process is matching;
wherein the processor configured to perform the fingerprint identification process on the original fingerprint image is further configured to:
perform image enhancement on the original fingerprint image to obtain a target fingerprint image;
compare feature points of the target fingerprint image with feature points of a pre-stored registered fingerprint template; and one of:
determine that the target fingerprint image is matched with the pre-stored registered fingerprint template when a ratio of the matched feature points of the target fingerprint image and the pre-stored registered fingerprint template is greater than or equal to a preset threshold; and
determine that the target fingerprint image is not matched with the pre-stored registered fingerprint template when the ratio of matched feature points of the target fingerprint image and the pre-stored registered fingerprint template is less than the preset threshold; and
wherein the pre-stored registered fingerprint template comprises N pre-stored registered fingerprint templates and N is an integer greater than 1, and the processor configured to compare the feature points of the target fingerprint image with the feature points of the pre-stored registered fingerprint template is further configured to:
acquire a number of times of comparison of the N pre-stored registered fingerprint templates in a preset time period;
sort the N pre-stored registered fingerprint templates in descending order of the number of times of the comparison acquired; and
compare the feature points of the target fingerprint image with the feature points of the sorted N pre-stored registered fingerprint templates sequentially.

8. The terminal device of claim 7, wherein the processor is further configured to:
after lighting up the screen of the terminal device, perform one of:
loading an application that was running when the screen of the terminal device was locked last time; and
loading an application bound to the target fingerprint image.

9. The terminal device of claim 8, wherein the processor configured to light up the screen of the terminal device is further configured to:
acquire brightness of a current environment and light up the screen of the terminal device according to the brightness of the current environment.

10. A non-transitory computer storage medium, wherein the non-transitory computer storage medium is configured to store programs that, when executed, are configured to:
acquire an original fingerprint image and trigger an interrupt request when a terminal device is in a screen-off state and a touch-press operation performed by a user on a fingerprint identification module of the terminal device is detected, and perform a fingerprint identification process on the original fingerprint image; and
unlock the terminal and light up a screen of the terminal device when detecting that a result of the fingerprint identification process is matching;
wherein the programs configured to perform the fingerprint identification process on the original fingerprint image are further configured to:
perform image enhancement on the original fingerprint image to obtain a target fingerprint image;
compare feature points of the target fingerprint image with feature points of a pre-stored registered fingerprint template; and one of:
determine that the target fingerprint image is matched with the pre-stored registered fingerprint template when a ratio of the matched feature points of the target fingerprint image and the pre-stored registered fingerprint template is greater than or equal to a preset threshold; and
determine that the target fingerprint image is not matched with the pre-stored registered fingerprint template when the ratio of the matched feature points of the target fingerprint image and the pre-stored registered fingerprint template is less than the preset threshold; and
wherein the pre-stored registered fingerprint template comprises N pre-stored registered fingerprint templates and N is an integer greater than 1, and the programs configured to compare the feature point of the target fingerprint image with the feature points of the pre-stored registered fingerprint template are configured to:
acquire a number of times of comparison of the N pre-stored registered fingerprint templates in a preset time period;
sort the N pre-stored registered fingerprint templates in descending order of the number of times of the comparison acquired; and
compare the feature points of the target fingerprint image with the feature points of the sorted N pre-stored registered fingerprint templates sequentially.

11. The non-transitory computer storage medium of claim 10, wherein the programs are further configured to:
after the screen of the terminal device is lit up, perform one of:
loading an application that was running when the screen of the terminal device was locked last time; and
loading an application bound to the target fingerprint image.

12. The non-transitory computer storage medium of claim 11, wherein the programs configured to light up the screen of the terminal device are configured to:

acquire brightness of a current environment and light up the screen of the terminal device according to the brightness of the current environment.

\* \* \* \* \*